(12) United States Patent
Ferrar et al.

(10) Patent No.: US 11,969,789 B2
(45) Date of Patent: Apr. 30, 2024

(54) METHOD AND APPARATUS FOR DETERMINING METAL POWDER CONDITION

(71) Applicant: LPW Technology Ltd, Widnes (GB)

(72) Inventors: Ben Ferrar, Alsager (GB); Ben Robinson, Stoke on Trent (GB)

(73) Assignee: LPW Technology Ltd., Widnes (GB)

( * ) Notice: Subject to any disclaimer, the term of this patent is extended or adjusted under 35 U.S.C. 154(b) by 304 days.

(21) Appl. No.: 16/763,733

(22) PCT Filed: Nov. 14, 2018

(86) PCT No.: PCT/GB2018/053294
§ 371 (c)(1),
(2) Date: May 13, 2020

(87) PCT Pub. No.: WO2019/097222
PCT Pub. Date: May 23, 2019

(65) Prior Publication Data
US 2021/0162509 A1   Jun. 3, 2021

(30) Foreign Application Priority Data
Nov. 14, 2017  (GB) ..................... 1718815

(51) Int. Cl.
*B22F 12/90*   (2021.01)
*B22F 10/28*   (2021.01)
(Continued)

(52) U.S. Cl.
CPC .............. *B22F 10/73* (2021.01); *B22F 12/90* (2021.01); *B29C 64/386* (2017.08);
(Continued)

(58) Field of Classification Search
CPC ... G01N 2015/1486; G01N 2015/1497; G01N 2015/1493; G01N 2015/149;
(Continued)

(56) References Cited

U.S. PATENT DOCUMENTS 6,996,358 B2 *  2/2006  Ayaki ................... G03G 9/0906
                                                     430/43.1
9,718,129 B2 *  8/2017  Ljungblad ............... B22F 12/00
(Continued)

FOREIGN PATENT DOCUMENTS

CN       106041076 B    10/2016
EP         0959342 A2   11/1999
(Continued)

OTHER PUBLICATIONS

Dawes, Jason et al., "Optimizing Metal Powders for Additive Manufacturing," Additive Manufacturing, blog post dated May 26, 2017, https://www.additivemanufacturing.media/blog/post/optimizing-metal-powders-for-additive-manufacturing-exploring-the-impact-of-particle-morphology-and-powder-flowability.
(Continued)

*Primary Examiner* — John R Lee
(74) *Attorney, Agent, or Firm* — Gerald T. Gray; Leydig, Voit & Mayer, LTD.

(57) ABSTRACT

A method of determining the condition of a metal powder for use in an additive manufacturing process, involving processing an image of the powder to measure a surface property of the powder, such as colour, texture or particle shape. The proportion of powder whose measured surface property falls outside a pre-determined range is determined and can be used to decide whether or not the powder is suitable for re-use. The proportion is determined by identifying individual particles in the image which are identified (Continued)

as statistical outliers amongst all of the particles shown in the image when considering a measured surface property. The relevant proportion may be determined statistically.

23 Claims, 3 Drawing Sheets

(51) Int. Cl.
| | |
|---|---|
| *B22F 10/73* | (2021.01) |
| *B29C 64/386* | (2017.01) |
| *B29C 64/393* | (2017.01) |
| *B33Y 10/00* | (2015.01) |
| *B33Y 30/00* | (2015.01) |
| *B33Y 40/00* | (2020.01) |
| *B33Y 50/00* | (2015.01) |
| *B33Y 50/02* | (2015.01) |
| *G01N 15/14* | (2024.01) |
| *G01N 15/1429* | (2024.01) |
| *G01N 15/00* | (2006.01) |

(52) U.S. Cl.
CPC ............ *B29C 64/393* (2017.08); *B33Y 10/00* (2014.12); *B33Y 30/00* (2014.12); *B33Y 40/00* (2014.12); *B33Y 50/00* (2014.12); *B33Y 50/02* (2014.12); *G01N 15/1429* (2013.01); *B22F 10/28* (2021.01); *G01N 2015/0096* (2013.01)

(58) Field of Classification Search
CPC ... G01N 2015/1488; G01N 2015/1477; G01N 2015/0096; G01N 2015/1472; G01N 15/1475; G01N 15/147; G01N 15/1468; G01N 15/1463; G01N 15/1459; G01N 2015/144; G01N 15/14; G01N 15/1434; G01N 15/1429; B22F 10/20; B22F 10/28; B22F 10/73; B22F 12/90; B29C 64/393; B29C 64/10; B29C 64/386; B33Y 50/02; B33Y 50/00; B33Y 30/00; B33Y 10/00; B33Y 40/00
See application file for complete search history.

(56) References Cited

U.S. PATENT DOCUMENTS

| | | | | |
|---|---|---|---|---|
| 10,981,225 | B2* | 4/2021 | Schade | .................. B29C 64/153 |
| 11,344,952 | B2* | 5/2022 | Narita | ..................... G01N 21/95 |
| 2010/0140550 | A1* | 6/2010 | Keller | .................... C09K 11/77 |
| | | | | 252/301.4 R |
| 2017/0203387 | A1* | 7/2017 | Ladewig | ............ B23K 15/0086 |
| 2017/0355146 | A1* | 12/2017 | Buller | ...................... B22F 10/36 |
| 2018/0124341 | A1* | 5/2018 | Harding | ............... H04N 5/3694 |
| 2018/0272613 | A1* | 9/2018 | Cieszynski | ........... B29C 64/268 |
| 2018/0345582 | A1* | 12/2018 | Schade | ................... B22F 10/00 |
| 2020/0238625 | A1* | 7/2020 | Champion | ............ B29C 64/165 |
| 2021/0162509 | A1* | 6/2021 | Ferrar | ..................... B22F 10/28 |
| 2022/0143704 | A1* | 5/2022 | Tran | ..................... B23K 26/082 |

FOREIGN PATENT DOCUMENTS

| | | | |
|---|---|---|---|
| EP | 2918395 | A1 | 9/2015 |
| EP | 3257608 | A2 | 12/2017 |
| RU | 2544047 | C1 | 3/2015 |
| WO | WO 02/44692 | A1 | 6/2002 |
| WO | WO 2010/036523 | A2 | 4/2010 |
| WO | WO 2015/025171 | A2 | 2/2015 |
| WO | WO 2016/165746 | A1 | 10/2016 |
| WO | WO 2017/036868 | A1 | 3/2017 |
| WO | WO 2018/071118 | A1 | 4/2018 |

OTHER PUBLICATIONS

Karlsson, Joakim et al., "Characterization and comparison of materials produced by Electron Beam Melting (EBM) of two different Ti—6Al—4V powder fractions," Journal of Materials Processing Technology 213(2013)2109-2118, Jun. 20, 2013.

Langley, Cathryn, "Optimising metal powders for additive manufacturing," TCT Magazine, blog post dated 2019 from Rapid News Publications Ltd., https://www.tctmagazine.com/tctblogs/guest-blogs/optimising-metal-powders-for-additive-manufacturing/.

Malvern: Material Relationships manual, "Automated Imaging-Advanced Particle Characterization," Malvern Instruments Limited, Worcestershire, UK, www.malvern.com.

* cited by examiner

METHOD AND APPARATUS FOR DETERMINING METAL POWDER CONDITION

CROSS REFERENCES

This Application claims priority to International Application No. PCT/GB2018/053294 by Ferrar et al., entitled, "METHOD AND APPARATUS FOR DETERMINING METAL POWDER CONDITION," filed Nov. 14, 2018, and United Kingdom Application No. 1718815.2, by Ferrar et al., entitled "METHOD AND APPARATUS FOR DETERMINING METAL POWDER CONDITION," filed Nov. 14, 2017, and both applications are incorporated in their entirety herein by reference.

TECHNICAL FIELD OF THE INVENTION

The present invention relates to a method and apparatus of determining metal powder condition, particularly but not exclusively the condition of a metal powder used in an additive manufacturing (AM) process.

BACKGROUND TO THE INVENTION

In a known AM process an AM machine produces articles from a powdered metal or alloy. The machine deposits a layer of powder on a build platform and the powder is subsequently selectively fused with a laser or electron beam, to form an article or articles. The process is repeated so that articles are formed layer by layer.

On completion of a build, unfused powder may be re-used in another build.

During a build operation unfused powder is subject to degradation. A metal powder may gradually oxidise, for example, which alters its properties and thus those of an article produced from the powder. The tendency of a powder to oxidise typically increases with temperature, and exposure to temperature may also affect other powder properties. Consequently, the nearer unfused powder is to an article being built, or a heat zone, the more likely it is to suffer degradation.

Also, when powder is fused the process may cause some heated particles of powder to be scattered from the powder bed around the manufactured article, degrading the quality of the unfused powder around the article.

To ensure adequate build quality of an article it is known to analyse used powder and stop recycling the powder when it has been degraded to a certain extent and/or to blend virgin powder with recycled powder so that the blended powder has an adequate bulk property for continued use. In an alternative approach a fixed upper limit is imposed on the number of times a batch of powder is recycled.

There are a number of problems with these approaches.

Powder condition is typically analysed by making a bulk oxygen content measurement. The measurement process involves oxidising a powder sample, which cannot then be re-used. More significantly, it has now been realised by the inventors that bulk oxygen content (or other bulk) measurement can give a false impression as to suitability of a powder for re-use, especially where recycled powder is blended with virgin powder to produce a blend with an overall bulk oxygen content below a desired threshold. This is because it is not sensitive to the presence of highly oxidised or otherwise degraded particles which may have a significant deleterious effect on a build even though the bulk oxygen content is below a desired threshold.

Applying a general limit to the number of times a powder is recycled is a relatively crude approach and does not take account of the likely amount of powder degradation caused by a specific build. The nature and extent of degradation can vary considerably between builds.

Because existing testing methods for powders are destructive test results never relate to powder that is actually re-used and so are always an approximation of the average condition of that powder.

It is an object of embodiments of the present invention to address some or all of these problems. In particular it is an object of embodiments of the invention to provide improved methods and apparatus for determining powder condition in a non-destructive way which can more accurately determine if the powder may be re-used in a particular build.

SUMMARY OF THE INVENTION

According to a first aspect of the present invention there is provided a method of determining the condition of a metal powder for use in an additive manufacturing process, the method comprising the step of processing an image of the powder.

According to a second aspect of the invention there is provided apparatus for determining the condition of a metal powder for use in an additive manufacturing process, the apparatus comprising a processor arranged to process an image of the powder.

The method may include the step of taking an image of the powder, and the apparatus may include a device for taking an image of the powder. The steps of taking the image and processing the image may take place at different locations.

The image of the powder may be taken as a single image or by combining multiple images or by scanning a surface of the powder to be imaged.

The image may be a digital image. It may be formed by, or divided into, a plurality of elements such as pixels. The elements are preferably of substantially the same size. It is preferred that the ratio of elements in the image to the number of particles in the imaged region or surface of the powder is at least of the order of 1:1, but preferably higher such as at least 10:1 or 100:1 or 500:1 or 1000:1. That way the colour of a particular element is likely to be influenced only by the colour of a single particle. An image for processing might typically comprise 2 to 6 million elements and show around 5000 particles of size generally in the range 40-50 μm.

The image may be a colour image.

The image may be represented by a set of data describing each image element, such as according to an established colour standard for example RGB or CIELAB.

Multiple images of the same volume or sample of powder may be taken. The images may be of adjacent or spaced apart areas of the powder. In embodiments at least 2, 3, 4, 5, 10, 50, 100 or more images of the same sample are taken, forming a set of images of the sample. The size of the set appropriate to a particular embodiment will depend on the size necessary to make the set statistically significant. Taking multiple images can help in assessing how well blended the sample or volume is.

The image or images may be processed to measure a surface property of the powder and/or a surface property of some or all particles of the powder represented by the image. The surface property may be colour, texture or any other observable surface property such as particle shape or packing density. The surface property may be one which is altered by degradation of the powder.

The image may be cropped to a chosen size and shape. This allows outlying regions of an optical image, which are more likely to contain distortion, to be excluded. It also allows for an easier and more reliable comparison between different images, especially those forming a set of images of the same sample. In an example an image is cropped to size 2000×2000 elements.

An image or all images forming a set may be processed to determine if its quality is sufficient for further processing and/or to determine if all images in a particular set are sufficiently similar. Images that do not meet specified quality criteria may be rejected and not processed further. This may for example involve determining statistics from data defining the image and rejecting images where the statistics do not fall within predetermined ranges, or differ from image to image by more than a predetermined threshold. In an example the mean luminance of a particular colour channel used to define the image is calculated for all image elements, or all image elements having greater than a threshold luminance, as well as a deviation from that mean.

Elements of the image having a luminance below a predetermined threshold may be identified. Space between imaged particles of powder will tend to appear darker than the particles. Identifying darker image elements enables them to be excluded from subsequent processing if desired. Darker image elements may be regarded as background elements and lighter elements foreground elements.

Images may also be processed to determine, or at least estimate, the number of particles of powder it shows, such as by watershed segmentation. This step, where present, is preferably performed after removal of background elements from the image.

As an alternative, or in addition, the number of particles shown in an image may be estimated by another suitable method not relying on the image, for example by a knowledge of the size of the area the image represents, mean size of powder particles and/or packing density of the powder.

The number of particles of powder with a measured surface property which falls outside a predetermined range may be determined. The proportion of powder with a measured surface property which falls outside a chosen range may be determined.

This may be achieved by identifying elements, preferably foreground elements, of the image which represent a surface property of the imaged powder with a parameter, typically colour, which lies outside a chosen range.

Element selection may be based on a statistical analysis of image element colour. Selected elements may be those with a colour which defines them as outliers in the colour distribution across all the foreground image elements. For example, elements may be selected by determining how their colour deviates from the mean colour of all image elements. Preferably the selected elements represent the outlying 5% or less 1% or less, or 0.1% or less of the colour distribution of imaged particles.

Having identified image elements that reflect a surface property falling within a range of interest, individual particles that have that surface property can then be identified. To do so groups of connected elements exceeding a predetermined number are identified. The number is chosen to be that which represents an imaged area expected to be occupied by a single particle of powder. The identified groups of image elements may thus be assumed to represent at least one, but typically one, particle with a surface property which meets the chosen criteria.

Where the ratio of image elements to imaged particles is close to 1:1 this step may be omitted and it assumed that a single image element represents a single particle.

Data can then be stored for each identified particle, being the data defining the image element or elements representing the particle. The number of image elements in an identified group is indicative of the size of the particle the group represents. The average colour of the image elements in the group is representative of the colour of the particle the group represents. This enables the number of identified particles to be determined, as well as properties of the particles and analysis of this data enables various information relating to the condition of the power to be determined or inferred. Particles identified in this way may be further classified by surface property, such as colour, to identify particles having a surface property which falls into a particular range. This enables an increased proportion of all imager elements or all foreground image elements to be initially identified in order to identify a greater number of particles of interest and classify those particles. Other techniques can then be used to select particles of interest from the identified particles.

The ratio of background to foreground image elements gives an indication of the ratio between particles of powder and space between those particles and thus an indication of the packing density of the particles. Changes in packing density observed in images of a batch of powder taken over time may reveal changes which affect powder flow properties.

Determining the overall (for example mean) colour of an image, particularly foreground image elements, is indicative of chemical properties of the powder and in particular the degree of oxidation of the powder, since oxidation of metal powders typically affects their colour. A knowledge of how oxidation affects the colour of a particular powder type may be used to determine a bulk oxygen content for the imaged powder.

The number of particles identified with a colour which falls outside a chosen range can reveal if a powder contains highly oxidised particles or is contaminated, such that it may be desirable that the power is not re-used. The number, together with the calculated or estimated total number of imaged particles may be used to calculate the proportion of particles with measured surface property falling outside the chosen range.

This information may be used to inform or control subsequent processing of the analysed powder or powder from which the analysed powder was taken.

The method may involve the step of indicating that a powder is not suitable for re-use when the number or proportion of particles identified as having a property outside a pre-determined range exceeds a predetermined range. The pre-determined range and the proportion may be established depending on the particular powder being analysed and its intended use. Typically, though, as the intention is to identify the presence of significantly oxidised or degraded particles the range is preferably set to encompass values for the measured surface property indicative of powder that has suffered what may be regarded as normal degradation as a result of being used in a build process, as might typically be caused by exposure to oxygen and low temperatures. Thus, those particles having a measured surface property outside of this range are outliers. Their measured surface property reflects the fact that they have been exposed to abnormal degradation, typically as result of being exposed to a high temperature (but without becoming fused to form part of a constructed article). It is thought that when the population of such outliers exceeds a certain proportion of the overall population of particles re-use of the powder carries an increased risk.

The method may also involve determining the average measured surface property of the proportion of measured powder whose measured surface property falls within the predetermined range. This measure is indicative of the overall average degradation of the powder excluding the outlying significantly degraded particles. This measure therefore gives an indication of the level of degradation resulting from normal degradation.

The method may also involve indicating that the tested powder is not suitable for re-use when average measured property of the proportion of powder, and thus approximate proportion of measured particles whose measured surface property falls within the predetermined range is greater (or less) than a predetermined threshold. Thus, powder can be indicated as no longer suitable for re-use as a result of the, possibly cumulative, effect of normal degradation.

The method may also involve determining the average measured surface property of all of the measured powder, and so all measured particles by processing data for all foreground pixels. Such a measure is indicative of the overall average degradation of all the particles, and so may give a similar indication to a bulk oxygen measurement, save that a bulk oxygen measurement will also measure "internal" oxygen of a particle, that being oxygen present inside a particle, as well as oxygen of any oxide outer layer the build-up of which affects a surface property of the particle.

The method may also involve indicating that the tested powder is not suitable for re-use when average measured surface property of all the powder, and so all measured particles, is greater or less than a predetermined threshold. The method may involve controlling apparatus based on measured condition of a powder, such as controlling an AM machine or powder handling or transport apparatus.

Where an average measured surface property of a powder, and thus particles of interest, is required this may be a mean, and may be obtained by determining the average measured surface property represented by those elements of the image showing the particles of interest.

The measurement may be made over a surface of the powder. The measurement may be made over a substantially planar surface of the powder. The method may involve placing the powder into a suitable container so that the powder has a substantially planar upper surface, and then performing the measurement over that surface. Alternatively the method may involve taking an image of power when in powder transport, processing or handling apparatus, such as a pipe. Such an image may be taken through a suitable window or opening into the apparatus. Alternatively the method may involve taking an image of power in an AM machine, such as the surface of a powder bed formed in the machine.

In all approaches the imaged powder preferably has sufficient depth so that the bottom of the container or other surface on which it is supported or by which it is contained is not visible through the powder. The powder may be a sample of powder taken from a batch of powder, such as a batch of powder recovered from an AM machine following a build operation.

The device for taking an image may comprise a microscope and/or camera and/or sensor. Indeed, any appropriate image capture device capable of measuring an observable surface property of particles of powder may be used.

The measurement and/or image may be taken in an enclosure. The enclosure may be substantially, or capable of being made, substantially light tight. The interior of the enclosure may be illuminated. The enclosure may be comprised in an AM machine, or powder transport, processing or handling apparatus.

The processor may be a programmed computer, and may be arranged to cause the apparatus to perform some or all of the method steps discussed above.

According to a third aspect of the invention there is provided a method of determining the condition of a powder, the method comprising measuring the colour of the powder.

As oxidation or other degradation of particles of a powder may alter their colour, measuring the colour of powder is a convenient way to assess degradation. Colour of the powder may be measured using any suitable technique.

The method may comprise taking an image of the powder. The image may be an optical image. The method may further comprise processing the image to measure the colour of the powder, and preferably of observed particles of the powder.

The average colour of the powder, or observed particles of the powder, may be measured, such as by processing an image of the powder. It may be determined whether or not tested powder is suitable for re-use depending whether or not the measured colour is inside or outside a predetermined range. The method may also comprise features of the first aspect of the invention.

According to a fourth aspect of the invention there is provided apparatus for determining the condition of a powder, the apparatus comprising a measuring device for measuring the colour of the powder.

The measuring device may be a spectroscopic device such as a spectrophotometer, an imaging device for taking an image, or some other suitable device or sensor. Where the measuring device is an imaging device it may be for taking an optical image and may comprise a microscope and/or camera and/or sensor. Indeed any appropriate image capture device capable of measuring an observable surface property of particles of powder may be used.

The processor may be arranged to perform the method of the third aspect of the invention. The apparatus may include features of the second aspect of the invention.

In all aspects of the invention particles of powder having a colour falling within a particular range of colours may be identified, and this may be used to infer the degree of oxidation of the particles having regard to experimental data relating to the powder type concerned.

Embodiments of aspects of the invention provide a non-destructive method and apparatus for determining powder condition and deciding whether or not a powder sample is suitable for re-use in a particular build operation. Where the determination is made by looking at the proportion of outlier particles this provides a new and useful measure of powder condition which enables improved decision making, and therefore powder use, over current measurements of bulk powder properties.

The method and apparatus is also useful for identifying the presence of contaminant particles where those particles a surface property which differs to the same property of particles of interest.

DETAILED DESCRIPTION OF THE INVENTION

In order that the invention may be more clearly understood embodiments thereof will now be described, by way of example only, with reference to the accompanying drawings, of which:

Figure 1:
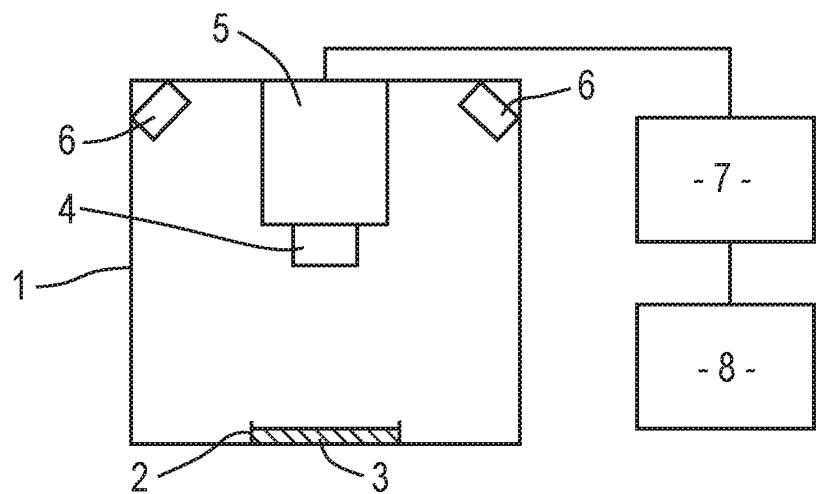
FIG. 1 is a schematic view of an embodiment of apparatus for analysing powder condition.

Referring to the drawings, FIG. 1 shows a first apparatus for analysing metal powder. It comprises an openable substantially light tight enclosure 1. The enclosure houses a container 2 for powder 3 which may take the form of a dish or slide, or any other suitable form. The container is open to the top and has a substantially square opening with a side of about 6 mm, giving it a surface area of about 36 mm². It has a depth of at least 2 mm. The container may be removed from the enclosure. The enclosure also houses a microscope 4 which is mounted to a digital camera 5, and lamps 6. The camera 4 comprises a substantially square sensor, such as a CCD sensor, with approximately four mega pixels and is connected to a computer 7 which comprises a keyboard and mouse or other user interface and is connect to a display 8 and/or other output device. The lamps are arranged to provide a diffuse light. They are shown as dome or flat dome lamps. In an alternative arrangement (and in other embodiments) a ring light could be used.

In use, a sample of powder 3 taken from a batch of powder to be analysed is introduced into the container 2, either with the container in or out of the enclosure 1. The powder is introduced in sufficient quantity to form a depth of powder which entirely obscures the bottom of the container 2 when viewed from above. So the depth of powder typically comprises at least two, and preferably more than two, layers of particles. The powder is levelled in the container so that it has a substantially flat upper, planar surface. If powder has been introduced into the container whilst outside the enclosure the container is then positioned in the enclosure beneath the microscope and the enclosure closed.

The lamps 6 are then activated. The lamps may be controlled by the computer 7. The lamps are arranged to illuminate the powder 3 in the container 2. Illuminating the powder with lamps in a substantially light tight enclosure enables powder to be analysed in controllable and repeatable light conditions.

The camera 5 is then caused to take an image of the upper surface of the powder in the container and to transmit it to the computer 7. The camera and microscope are arranged to take an image of substantially all of the surface of the powder in the container. The field of view of the camera and microscope thus images an area of about 36 mm². Metal powders used in AM processes typically have an average diameter of the order of tens of microns. As such, the number of particles visible to the surface of the powder imaged by the camera will be of the order of thousands and so about three orders of magnitude less than the number of pixels of the sensor. The camera is thus able to produce a digital image of the surface of powder in which there about 1000 times as many pixels than the number of particles of powder shown in the image.

The image taken by the camera is then transmitted to the computer 7 for processing.

Figure 2:
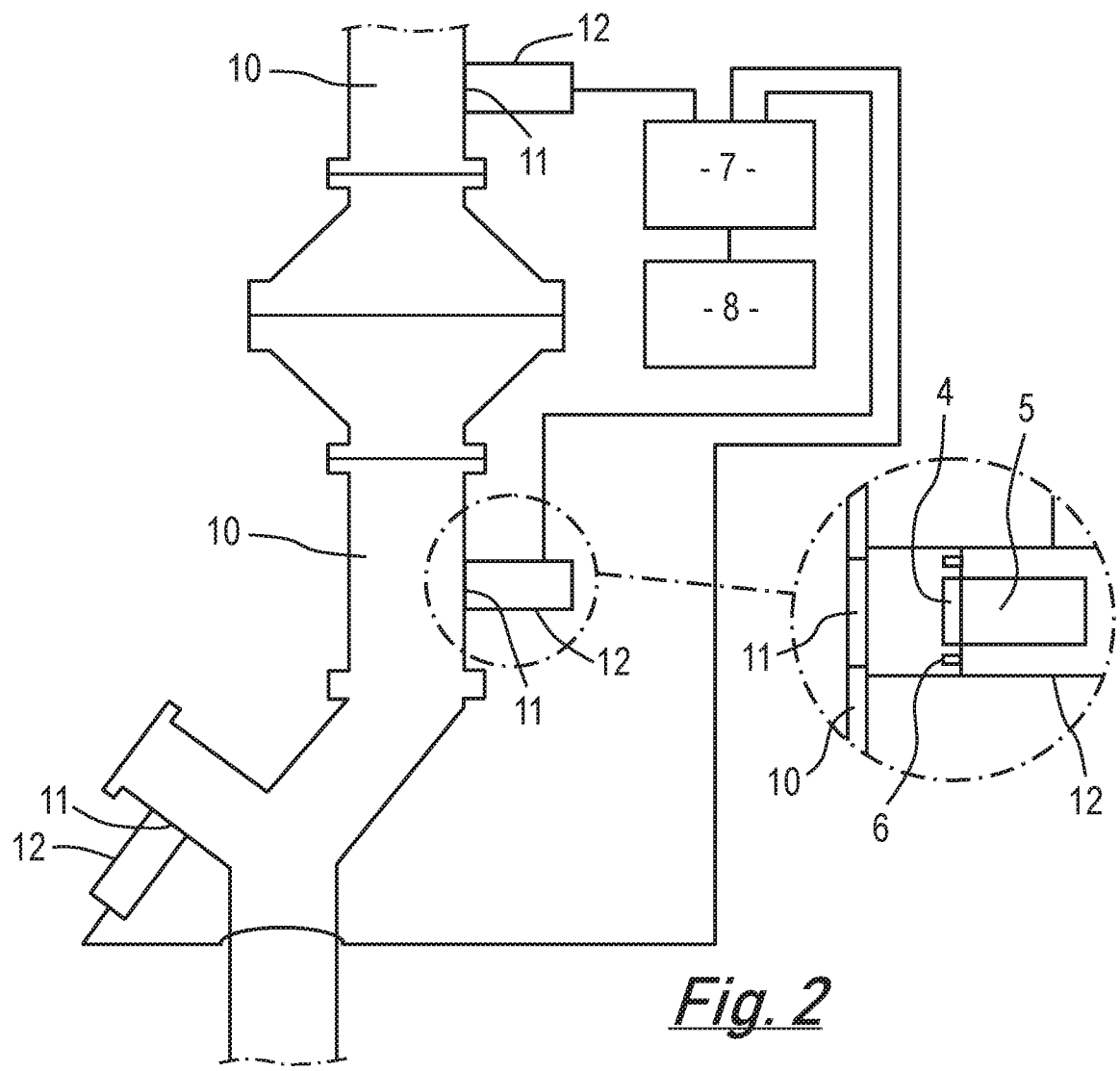
FIG. 2 is a schematic view of another embodiment of apparatus for analysing powder condition.

FIG. 2 shows a second apparatus for analysing metal powder, in this example built in to powder transport pipes 10 leading into and out of a powder sieve, and into a connected a powder blending device. Each pipe includes a transparent window 11 over which is fitted an enclosure 12 which houses a digital camera 5 fitted with an appropriate lens 4 for taking an image of powder in the pipe 10 through the window 11. A lamp or lamps 6 is/are provided in the enclosure around the lens 4 to illuminate the powder through the window 11. The camera outputs its image to a computer 7 without output device 8.

As with the apparatus shown in FIG. 1 the digital camera 5 has a sensor with about 1000 times the number pixels than the expected number of powder particles visible in the area of the window 11 imaged by the camera when the pipe is full of powder to be analysed.

A window 11 and associated enclosure 12 with camera 5 is provided in both of the pipes 10 leading to and from the sieve enabling the condition of powder to be analysed before and after sieving. Cameras also enable the condition of powder entering both the powder blending device.

Windows could be provided into powder transport conduits or powder storage containers of other types of apparatus, such as for example an additive manufacturing machine.

Figure 3:
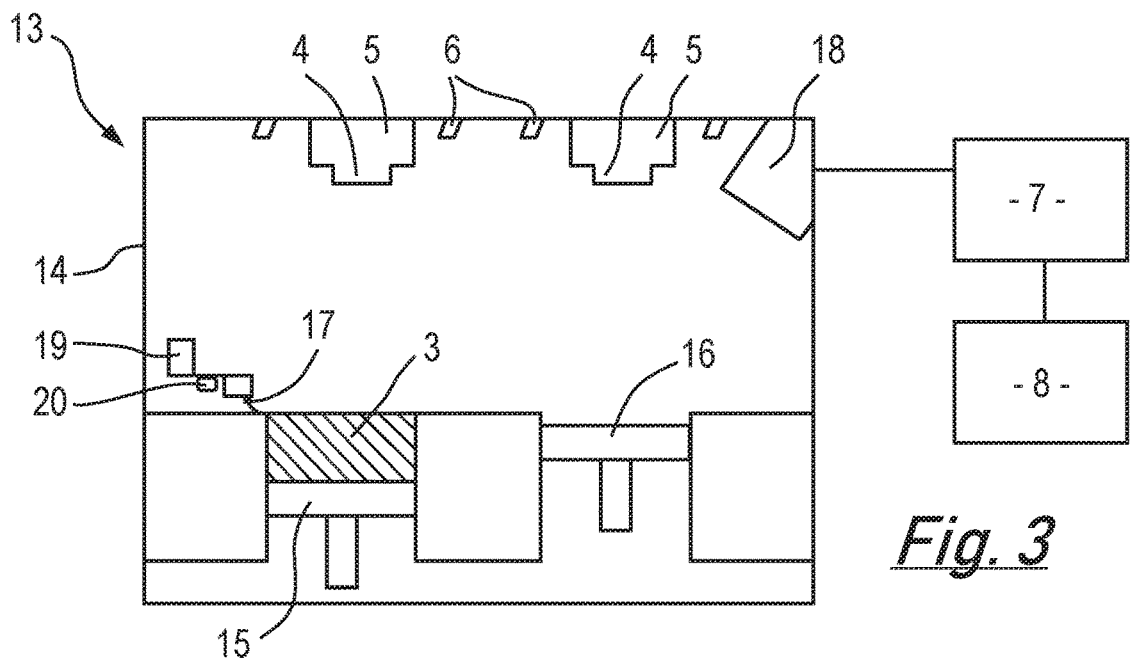
FIG. 3 is a schematic view of another embodiment of apparatus for analysing powder condition.

FIG. 3 shows a third apparatus for analysing metal powder, which in this example is built into an additive manufacturing machine 13. The machine comprises an enclosure 14 which is or can be made substantially light tight. The enclosure houses a powder delivery container with a powder delivery piston 15, a build container with a build platform 16, and a wiper blade 17 mounted to a moveable support for transferring powder from the powder delivery container to the build container. The enclosure also houses output optics 18 of a laser for selectively melting powder on the build platform 16. These features are all common to known selective layer melting additive manufacturing machines.

The enclosure 14 additionally houses two cameras 5 with appropriate lenses 4 for taking an image of an area of the top surface of powder in the powder delivery and build containers, and lamps 6 disposed around each camera. An imaging sensor 19 and lamp 20 is also mounted to the moveable support for the wiper blade and arranged to scan an image of the surface of powder in the powder supply or build containers as the wiper blade travels to and fro across the containers.

The cameras 5 and sensor 19 are arranged to output an image to a connected computer 7 with output device 8. As with the apparatus shown in FIGS. 1 and 2 the digital camera 5 and sensor 19 are arranged to produce an image of powder with about 1000 times the number pixels than the number of particles shown in the imaged area of powder.

It will be appreciated that the machine shown in FIG. 3 need only have a single imaging device.

In use each embodiment of the apparatus produces a digital image of the surface of powder in the apparatus. The digital image comprises a set of data defining properties of image elements. The ratio of image elements to the number of particles of powder shown in the image is about 1000. The image data is transmitted to the computer where it is stored in a manner where the colour and luminance of each element of the image is defined in the CIELAB colour space by variables L, a and b.

Figure 4:
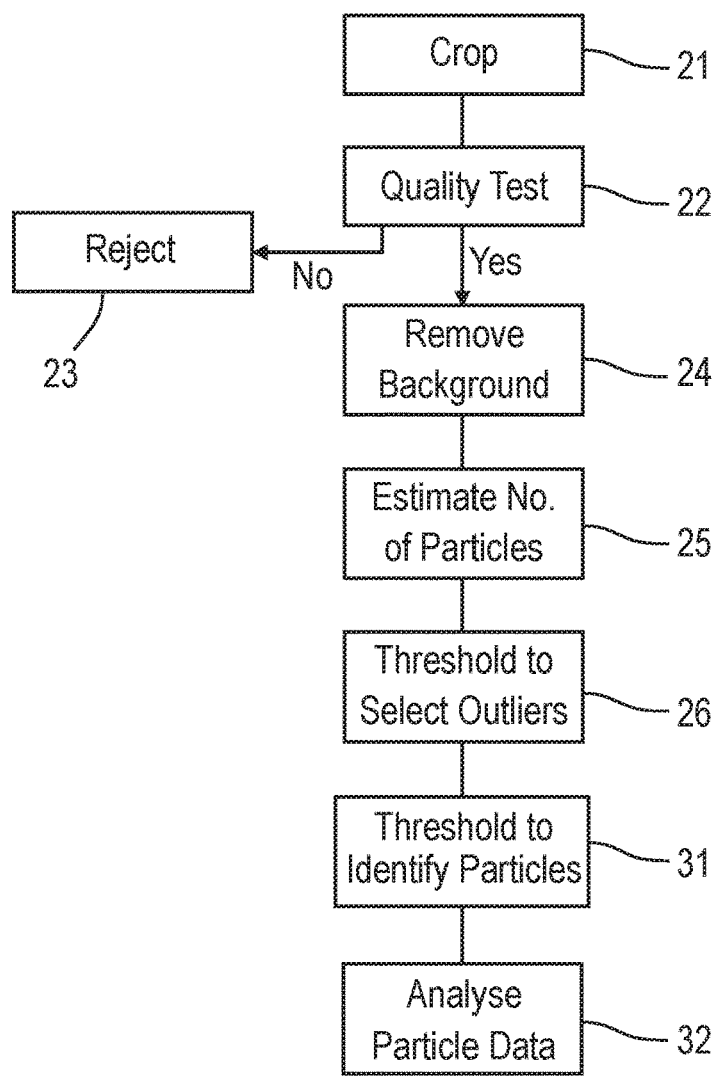
FIG. 4 is a flowchart showing steps involved in processing an image of powder.

The computer is arranged to process the image data in order to determine information relating to the condition of the powder shown in the image by performing at least some of the steps shown by FIG. 4.

As a first optional step 21 the image may be cropped to a predetermined size, excluding elements outside a boundary (or some other chosen region) of the original image. This optional step allows distorted areas of an image to be excluded as well as enabling images taken by different cameras or sensors to be reduced to represent the same area and/or to have the same number of pixels.

The remaining image data, or remaining image data, may then be tested 22 to ensure that it is of sufficient quality for further processing. If not, it is rejected at 23 and a new image is obtained.

If the image data is of sufficient quality, the computer then identifies elements with a luminance below a predetermined threshold and removes these from the image data at 24, with the aim of removing elements which represent space between particles of powder (or other background material) in the image. The actual threshold will depend upon characteristics of the particular apparatus being used and type of powder being tested. With the elements of the image removed which lie outside the threshold the remaining image elements are taken to represent particles of powder in the foreground of the image.

The data for the remaining image elements may then be processed at 25 to estimate the number of particles they represent using a suitable technique, such as watershed segmentation. The total number of particles represented can also be estimated in other ways. For a given powder and apparatus the number of particles expected to be visible in an area of the surface of the powder corresponding to that represented by the image data can be calculated with a knowledge of the expected particle size and expected packing density of the powder.

The data for the remaining image elements is then statistically analysed at 26 to determine how the colour of each image element is distributed about the mean colour of all remaining elements to detect outlier elements with a colour that places them outside a threshold proportion of the entire population of elements. This may be performed using a Chi-squared test for outlier detection. The relevant proportion of the population may be selected according to the type of powder being analysed, but a typical proportion is 0.1%, that is to say that the elements of interest, the outlier population, make up 0.1% of the entire population of elements.

Figure 5:
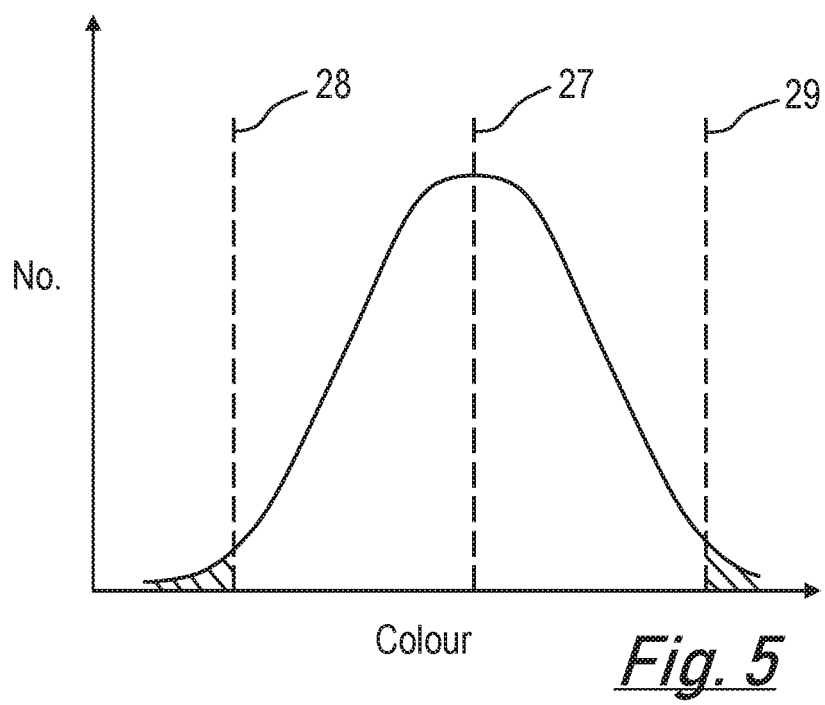
FIG. 5 is a graph showing number of particles against colour.
Figure 6:
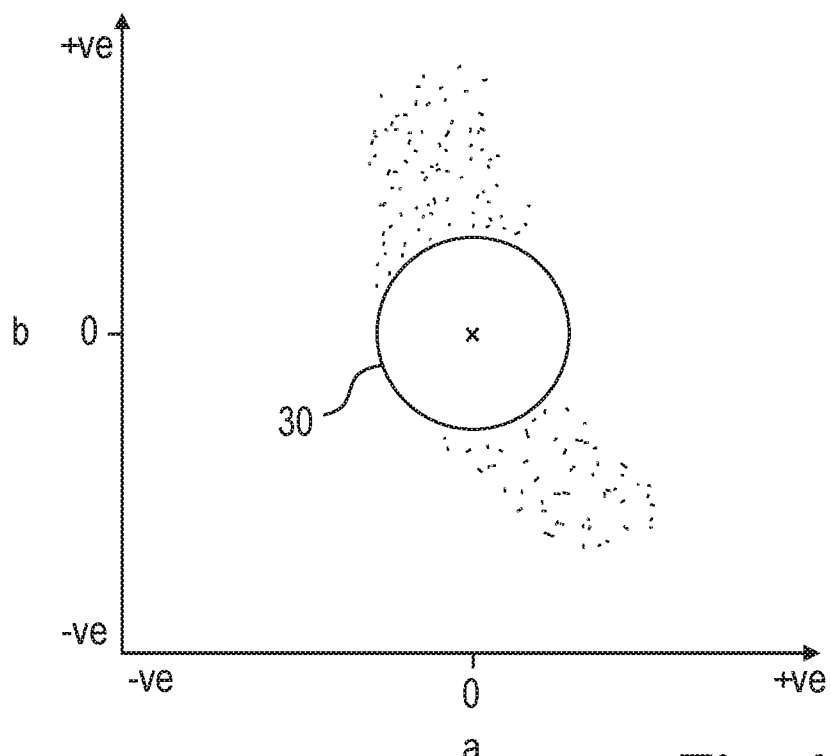
FIG. 6 is a plot of image elements on axes representing the a and b parameters in CIELAB colour space.

Visual representations of this step are shown in FIGS. 5 and 6. FIG. 5 plots the number of image elements on the vertical axis against a measure of colour on the horizontal axis. This shows a generally bell-shaped curve of colour distribution about a mean value at 27, and lower 28 and upper 29 thresholds which identify the outlying 0.1% of the population represented by the area under the curve outside the thresholds. FIG. 5 shows the same data where the a and b values for each image element in CIELAB colour space are plotted respectively on the horizontal and vertical axes and the threshold is the circle (or ellipse) 30. The elements falling within the circle 30 have been removed leaving the remaining 0.1% outlier population.

The outlier elements are then subjected to a connected component filter at 31 to determine if they are spatially connected in the image they define. Any group of connected image elements which exceeds a predetermined number of elements is considered to represent a single particle. The data representing each such identified group is associated with a unique particle identifier with the first identifier identifying the largest group of connected elements, the second identifier identifying the next largest group of connected elements, and so on.

At this stage the computer has produced sets of image data which define the size and colour of individual particles within the images powder with a colour that causes them to represent statistical outliers within the powder.

This data is then analysed to extract useful data relating to the condition of the analysed powder, including:

The number and thus proportion of particles having a colour which lies outside a predetermined range.

The mean colour of image elements lying within the predetermined range.

The mean colour of all imager elements.

It has been found that the colour of metal particles changes as the particles degrade. In particular it changes as particles oxidise and/or are exposed to heat. The more a particle is oxidised or the higher temperature a particle is exposed to the greater its colour changes. So, the amount of colour change is related to the degree of degradation a particle has suffered and thus also its suitability for re-use.

It has further been found that, notwithstanding the average condition of a batch of powder, the presence of highly degraded particles can render the batch unsuitable for re-use. This is because inclusion of even a single highly degraded particle in a build can significantly affect properties of the build. Where a highly degraded particle or particles become(s) incorporated into an article this could render the article unsafe, especially if the particle(s) is/are incorporated into the article at a location where there will be a stress concentration in use.

The first measure above will, assuming that the batch of powder from which the sample is taken is well mixed or the imaged area of a powder is representative of the constitution of the powder as a whole, generally mirror the proportion of significantly degraded particles throughout the sample and throughout the, or batch of, powder tested. Multiple samples may be taken from a given batch and analysed separately, or multiple tests performed on a batch of powder in order to improve accuracy such as by taking multiple images of a surface of the powder. And/or a particular sample could be analysed, mixed, and then reanalysed. An appropriate colour range and threshold minimum proportion outside that range can be determined for a given powder and build and where the proportion of particles outside the threshold exceeds the chosen limit the batch of powder is deemed unsuitable for re-use, at least for the build in question.

Thus, this measure enables powder condition to be determined independent of a bulk quantity.

The second measure provides an indication of the average degradation of the remaining powder when the particles with colours lying outside the threshold have been discounted. Such a measure is more akin to the result of a conventional bulk oxygen measurement, but obtained in a more convenient and non-destructive way, save that it excludes the influence of significantly degraded particles (or any internal oxygen). Powder may be deemed unsuitable for re-use where the average colour of the remaining particles, when the particles with colours lying outside the predetermined range have been discounted, lies outside another predetermined range of colours.

The third measure is similar to the second measure, but takes account of the significantly degraded particles. Powder may be deemed unsuitable for re-use where the average colour of particles lies outside another predetermined range of colours.

A decision whether or not to re-use powder can be based on one or more of the three measures described above. Typically a powder would not be re-used if any measure determines that the powder should not be re-used. In one embodiment the first and second measures are calculated and powder deemed unsuitable for re-use if either measure indicates this.

It is useful to analyse new powder before it is used and to subsequently analyse it after it has been used in a build process and any further build processes. Analysis of the new powder provides useful control data with which to compare that of subsequent analysis.

Other information about a powder may be determined from an image of the powder. Non-powder artefacts may be detected in the powder. Anomalous powder particles may also be detected, for example particles made of different material to that intended, where the anomalous particles may be identified by an observable property. An estimate of total incident energy received by the powder may be made. Where multiple images of a sample or batch of powder are made and analysed it is possible to determined how well blended the powder is by comparing results between images. Images taken form powder processed by different machines, such as AM machines, may be used to compare machine performance and/or determine machine health. Images taken a different time periods and/or different positions in apparatus can help to track transit of powder through the apparatus.

Where apparatus is incorporated into powder handling apparatus or an additive manufacturing machine the output of test results may automatically cause the apparatus to perform a certain function. For example, powder may be rejected for further use, or combined with other powder to refresh it before further use. An additive manufacturing machine may be stopped or a wiper blade caused to remove a layer of powder and replace it before any powder is fused.

Data relating to analysis of powder may be stored so as to validate a build using the powder. In particular, analysis of at least part of the surface of layers of powder deposited during a build process may be stored to provide evidence of the consistency or otherwise of the powder used throughout a build process. Also, time stamped data can be compared from multiple images of powder taken at different points throughout a powder transport system to audit the performance of that system, e.g to show how effectively oxidised or contaminated powder moves through it.

In each example, the computer is provided with suitable software to cause the camera to take an image, to process the image to determine colour distribution amongst image elements, to enable a user to input ranges, proportions or other values, to calculate one or more of the three measures, to determine if a particular sample may or may not be re-used having regard to the range(s) and proportion specified by a user and to output this result to a user via the display 8 or otherwise.

In one example a sample of used Ti64 alloy powder was analysed using the described apparatus. The image of the powder produced showed the vast majority of the powder to have a silver/grey colour generally similar to the colour of virgin powder, and a very small proportion to have a green, brown, blue, purple or black colour, these colours being indicative of increased oxidation or other degradation. A pre-determined range of colour was therefore chosen to encompass silver/grey particles and exclude the other colours representing 0.1% of the overall population of image elements. This range effectively encompassed particles which had suffered no or limited oxidation and been subjected only to low temperatures. A proportion of particles having a colour outside this range, effectively a proportion of particles that have suffered significant oxidation or degradation through exposure to high temperatures, could then be chosen as the limit beyond which the powder should not be re-used. When the colour of the observed particles was plotted in the manner shown in FIG. 5 it could be seen that the particles with colours other than silver/grey brown effectively represented outliers to the general distribution of particles.

The above embodiments are described by way of example only. Many variations are possible without departing from the scope of the invention as defined in the appended claims.

The invention claimed is:

1. A method of determining a degradation of a metal powder for use in an additive manufacturing process, the method comprising:
   processing an image of the metal powder to measure a colour of the metal powder; and
   determining the degradation of the metal powder based on the colour of the metal powder.

2. A method as claimed in claim 1 comprising the step of taking the image of the powder.

3. A method as claimed in claim 1 wherein the image is an optical image.

4. A method as claimed in claim 1 comprising the step of cropping the image.

5. A method as claimed in claim 1 comprising the step of checking the quality of the image.

6. A method as claimed in claim 1 wherein the image is formed by, or divided into, a plurality of image elements.

7. A method as claimed in claim 6, wherein the ratio of image elements in the image to the number of particles in the imaged powder is at least 100:1.

8. A method as claimed in claim 6 wherein image elements having a luminance below a threshold are identified and excluded from further processing.

9. A method as claimed in claim 8 comprising the step of calculating the ratio of image elements above and below the threshold.

10. A method as claimed in claim 1 wherein the image is processed to estimate the total number of particles of powder it shows.

11. A method as claimed in claim 1 where the image is processed to identify image elements which represent a surface property of imaged powder which falls outside a chosen range.

12. A method as claimed in claim 11 wherein the image elements are identified by selecting those which represent a predetermined outlying proportion of the distribution of represented surface property of all image elements considered.

13. A method as claimed in claim 12 wherein the outlying proportion is less than 5% or less than 1%.

14. A method as claimed in claim 11 wherein groups of connected identified image elements above a predetermined size are identified thereby to identify particles of powder with a surface property that falls outside the chosen range.

15. A method as claimed in claim 14 comprising the step of storing, for each identified particle, data relating to each image element representing the particle and a unique identifier.

16. A method as claimed in claim 1 comprising the step of determining the number of particles in the image with a surface property which falls outside a chosen range.

17. A method as claimed in claim 11 comprising the step of indicating that the powder is not suitable for re-use when the proportion of measured powder whose measured surface property falls outside the chosen range exceeds a predetermined value.

18. A method as claimed in claim 11 comprising determining the average measured surface property of the measured powder particles whose measured surface property falls within the chosen range.

19. A method as claimed in claim 18 comprising the step of indicating that the tested powder is not suitable for re-use when average measured surface property of the powder whose measured surface property falls within the chosen range is greater or less than a predetermined threshold.

20. A method as claimed in claim 1 comprising the step of processing the image to resolve individual particles and measuring a surface property of each individual particle.

21. A method as claimed in claim 1 comprising the step of placing the powder into an enclosure and illuminating the powder in the enclosure.

22. Apparatus for determining a degradation of a metal powder for use in an additive manufacturing process, the apparatus comprising:
   a camera; and
   a computer arranged to process an image of the metal powder taken by the camera to measure a colour of the metal powder and to determine the degradation of the metal powder based on the colour of the metal powder.

23. A method of determining a degradation of a metal powder for use in an additive manufacturing process, the method comprising:
   processing an image of the metal powder to identify particles of powder with a surface property that falls outside a predetermined range; and
   determining the degradation of the metal powder based on the identified particles of powder with the surface property that falls outside the predetermined range.

* * * * *